3,167,464
DECORATIVE SURFACE COVERING AND PROCESS FOR PREPARING SAME
Frederick H. Cook, Summit, N.J., assignor to Congoleum-Nairn Inc., Kearny, N.J., a corporation of New York
Filed Dec. 12, 1960, Ser. No. 75,354
15 Claims. (Cl. 156—254)

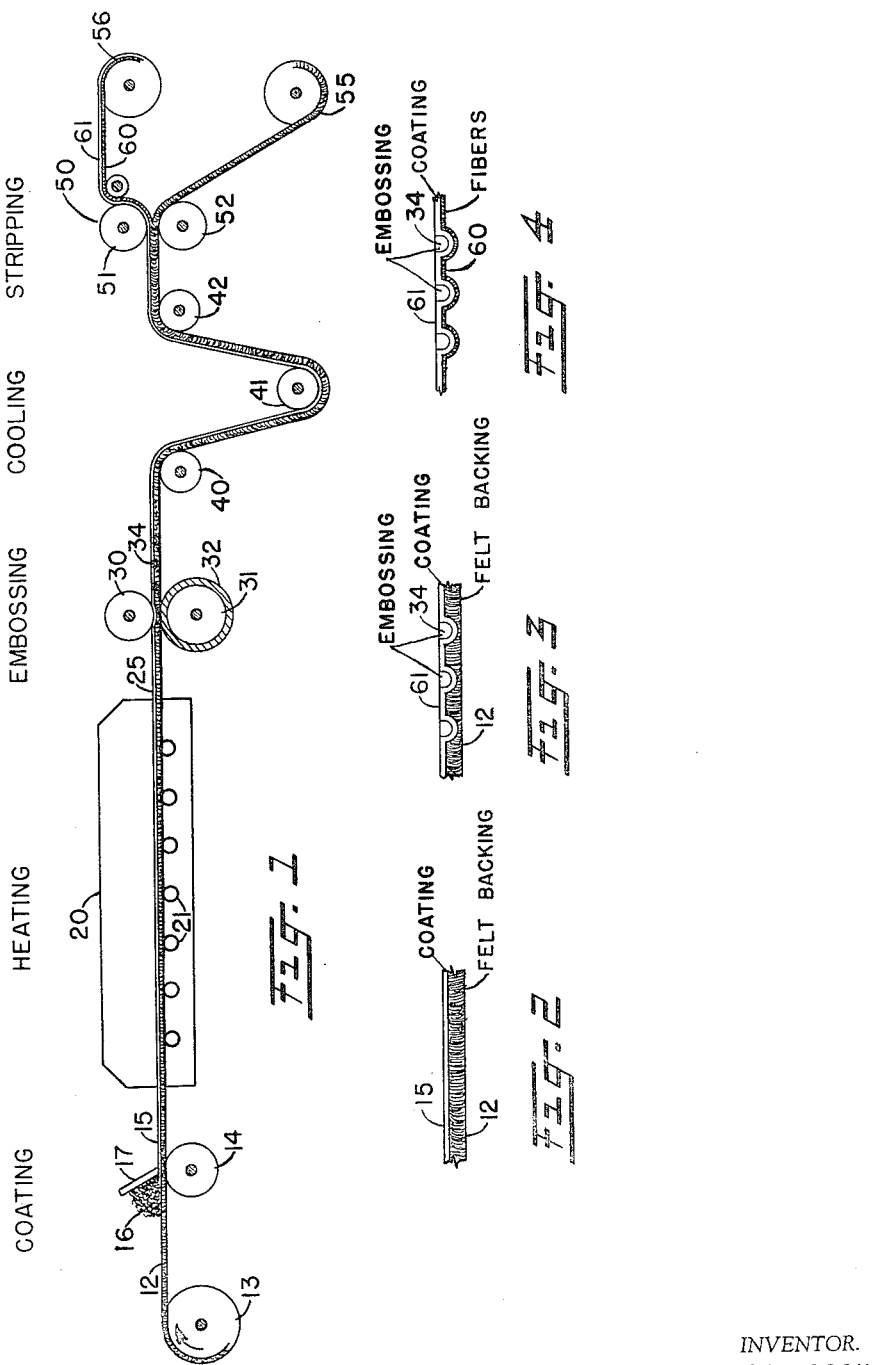

This invention relates to decorative surface coverings and particularly to surface coverings having a depressed design in a resinous composition wear layer.

A large number of different types of plastic surface coverings are available. These coverings generally are classified according to whether they have a backing or are unbacked. The backed variety are usually formed by applying one or more coatings of resinous wear resistant composition to the surface of the backing. The wear resistant composition can be either transparent or pigmented. In the case of a transparent composition, a design is usually printed on the surface of the backing by any of the conventional printing techniques. The backing is usually a woven fabric which gives strength to the surface covering and also aids in receiving adhesive for securing the product to the surface to be covered. Paper has been used as a backing although it is less desirable being subject to deterioration by exposure to heat and damp conditions, and also it is subject to permanent creasing because of its poor recovery. The coating applied to the backing is passed through an oven whereby it is subjected to sufficient heat to fuse the composition and evaporate any solvents which may be present in the coating composition. Care must be exercised in selecting the backing since the heating step can be quite detrimental to certain types of backings such as thin paper and some fabrics.

The unbacked type of surface coverings are conventionally formed of a transparent or pigmented film which can be prepared by casting or molding the resinous composition by use of calender rolls. If the film is transparent, it is necessary to print an overall design on the undersurface of the film. This type of product has several disadvantages. The back of such film is smooth and therefore necessitates the use of expansive adhesives in order to secure them to the surface to be covered. Another disadvantage is that films of substantial thickness are required to prevent tearing and to aid in handling during installation. The use of thicker films materially increases the cost of the product.

Many of the surface coverings available on the market have been treated by embossing the surface to give the product a textured appearance. The depth of embossing in such products is usually limited to less than the thickness of the film or coating. Films are available, however, which are embossed to a depth greater than the thickness of the film. In order to accomplish such deep embossing it is necessary to use an extremely resilient back-up roll to press the film against the embossing roll. The high pressures required are quite detrimental to the resilient covering which necessitates frequent replacing. Embossing is a very desirable technique for decorating surface coverings since elaborate types of multicolored decorations can be produced my making use of the valley printing technique which involves the simultaneous printing and embossing.

It is an object of the invention to provide a surface covering having a resinous composition wear layer with an embossed decoration. Another object of the invention is to provide such a product wherein the embossing extends to a depth greater than the overall thickness of the surface layer. A further object of the invention is to provide such a decorative surface covering which can be readily secured to a surface using relatively inexpensive adhesives. A further object is to provide a simple and economical process for producing such a surface covering. Other objects and the advantages of the invention will appear hereinafter.

In accordance with the invention, a decorative surface covering having a resinous composition wear layer is produced by applying a resinous composition to the surface of a densified felt sheet, heating the coating to fuse the composition, embossing the surface of the fused composition and thereafter stripping substantially all of the densified felt from the coating. The presence of the felt during embossing enables the coating to be embossed to a depth greater than the thickness of the coating. In addition, the product readily receives all types of adhesives since a thin layer of fibrous particles is allowed to remain adhered to the back of the coating. The product of the invention therefore has the advantages of a backed product in that it has only a thin wear layer of fused composition, is highly tear resistant, resistant to curl, and also has the advantages of an unbacked product in being extremely flexible, light in weight, and easily cut and handled during installation. The procedure of the invention therefore provides a simple and economical method for producing very thin resinous composition surface coverings having many advantages not heretofore obtained in one type of surface covering.

The invention will be better understood from the following detailed description when read in conjunction with the accompanying drawings wherein:

FIG. 1 is a schematic representation of apparatus for carrying out one embodiment of the invention;

FIG. 2 is a cross-section of the backing after coating with a wear resistant composition;

FIG. 3 is a cross section of the surface covering prior to removal of the backing; and FIG. 4 is a cross-section of the final product produced by the procedure illustrated in FIG. 1.

Referring to FIG. 1 a densified felt sheet 12 is fed from a supply roll 13 and is passed over a roll 14. A coating of liquid resinous composition 15 is applied to the surface of the impregnated felt 12 from a mass of liquid resinous composition 16 by means of a doctor blade 17 which controls the thickness of the coating. The sheet is then passed through a heating chamber 20, such as a hot air oven or a bank of infrared heat lamps, in which it is supported by means of spacer rolls 21. The oven is heated to a sufficiently high temperature to cause the complete fusion of the resinous composition. The sheet emerging from the oven bears an upper layer 25 of fused resinous composition as illustrated in FIG. 2. The product, in a heat-softened condition, is then passed to an embossing apparatus comprising two rolls 30 and 31. Roll 30 is a steel roll having a suitable design engraved in its surface and roll 31 has a resilient covering 32. The pressure between rolls 30 and 31 causes the design 34 to be impressed into the fused resinous composition layer 25. The pressure exerted on the sheet is usually about 400 to 800 pounds per lineal inch but higher and lower pressure can be used. The product is thereafter cooled by passing over cooling rolls 40, 41, 42. The cooled sheet is passed to a stripping mechanism generally indicated at 50. The stripping mechanism comprises two rolls 51 and 52. Roll 52 is rotated at a rate slightly faster than roll 51. The backing material is allowed to follow roll 52 and is fed to a collecting roll 55. The embossed coating is caused to travel in contact with roll 51 and is thereafter fed to a collecting roll 56. The stripping apparatus is operated so as to remove substantially all the impregnated felt backing from the coating leaving only a thin layer 60 adhering to the back of the embossed coating 61. The angle at which the felt is stripped is critical to the invention and must be between about 90° and about 180° from the remaining felt layer. It is also essential to the invention that the strength of the felt backing be less than the strength of the bond between the coating and the felt. In this manner sufficient felt will remain on the back of the coating to give it a surface which readily receives adhesives. It is also essential for the felt to be sufficiently densified so that it will be removed in a uniform sheet otherwise the product will have an irregular thickness. Best results are obtained when the felt is impregnated with a resinous material to bind the fibers together. The impregnant also serves to give the felt sheet sufficient strength to withstand the strain occurring during processing.

The felt backing should have sufficient flexibility to permit the product to be rolled and unrolled without cracking or tearing. Numerous fibrous materials can be used in preparing a fibrous backing for use in the invention. In addition to inexpensive cellulosic fibers, other types of fibers can be used including those of animal and mineral origin. The source of cellulosic film can include cotton or other rags, wood pulp, paper boxes or mixtures thereof in any proportion. In addition, fillers such as wood flour, talc, and the like can be used. A slurry of fibrous materials in water is formed into a sheet using any of the conventional techniques for producing felt. For example, sheet formulation can take place in a Fourdrinier or cylinder paper machine. After formation of the sheet, it is conventionally subjected to vacuum drying to remove all of the water.

As indicated above, it is preferable to use a felt impregnated with a resinous material as the backing. The particular impregnant selected is not critical to the invention although it must be used in sufficient quantities to hold the fibers of the sheet together in a unitary form and resist delamination. The impregnant must be compatible with adhesives so that after installation there will be no adverse migration of impregnant to adhesive. It is also necessary for the impregnants to be sufficiently stable to withstand the high temperatures encountered during processing of the surface covering. It should be free from any volatile components and also must not soften to such an extent as to extrude from the sheet. In addition, the impregnant should not be subjected to any detrimental chemical changes at high temperature. Fibrous sheets impregnated with thermoplastic resinous materials are particularly suitable for use as backing sheets in the invention. Suitable resins include vinyl resins such as polyvinyl chloride, polyvinyl acetate, polymerized vinylidene chloride, mixtures of these with each other, copolymerized with each other and with other monomers copolymerizable therewith. Polymerized acrylic and methylacrylic acids and their polymerized derivatives are particularly suitable. In addition, resinous substances such as polyethylene, polystyrene, elastomers such as butadiene styrene, butadiene acrylonitrile, polymerized chloroprene, natural rubber and the like. In addition, other thermoplastic resins and thermosetting resins can be used which, under the influence of heat, cure by polymerization and cross-linking. Such resins as phenolic resins, polyesters, oleoresins, as for example, drying oils, isocyanates, polyurethanes, and similar materials are suitable. The impregnants are conventionally added to the felt sheet for passing the finished sheet through an emulsion or solution of the resin and subsequently drying and/or curing the resin. Alternately, the resin can be added during the formation of the felt sheet by dispersing or dissolving the resin in the fiber furnish.

The density of the fibrous sheet useful as a backing for a surface covering is lower than that of paper. The physical characteristics of a sheet of this type are commonly defined by the ratio of the thickness of the sheet to the weight of a specified area. This ratio is often referred to as the gauge to weight ratio. It is preferred that the fibrous sheet used as a backing according to the invention have a gauge to weight ratio in excess of 0.8 as defined by the formula:

$$\frac{\text{Thickness of felt (thousandths of an inch)}}{\text{Weight of 480 sq. ft. of dry sheet (pounds)}}$$

A particularly effective range of gauge to weight ratios is from about 0.8 to about 1.2. These values are to be contrasted with the gauge to weight ratio of paper which is normally about 0.4 and rarely reaches 0.8. The thickness of the felt can vary widely but it is preferred between about 20 to about 50 mils in thickness.

The fibrous base may have one or more thin coatings which serve as seal coats to prevent the bleeding of the impregnant into the wear resistant composition layer, to help bond the wear layer to the felt backing, or serve as a background color if a design is to be printed on the surface of the backing for use with a transparent, transluscent, or partially transparent wear layer. The thinness of such coatings can vary but usually are in the order of one to three mils in thickness. It is sometimes desirable to use multiple coatings in order to obtain optimum adhesive characteristics between the various component layers. The seal and/or base coats are preferably applied in the form of an aqueous emulsion of resinous binder and filler. In the preparation of the seal coats, the resinous binder and filler are emulsified in water in the presence of conventional wetting agents, thickening agents, anti-foam agents, sequestering agents and the like. After the application of each seal coat to the fibrous backing sheet, the coating is dried by subjecting the sheet to heat, as for example, in the range of about 100° F. to about 150° F. for about 30 minutes to about 2 hours. Alternately, drying can be effected by exposing the coated sheet after the application of each seal coat to a temperature of about 300° F. to about 400° F. for one to five minutes.

As indicated above, the seal coat is preferably applied in the form of an aqueous dispersion. Many vinyl resins suitable as an ingredient in the seal coat are commercially available in the form of an aqueous dispersion containing from 40 to 50 percent solids. These dispersions also contain wetting agents, anti-foaming agents and sequestering agents. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oil, silicone anti-foam agents such as Anti-foam A manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. Alkali is usually present to provide a pH of above 7.0 so that there will be no tendency for the latex to coagulate. Calcium hydroxide, sodium hydroxide, ammonia, and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively applied in the form of a solution using, for example, a solvent such as toluene or methyl ethyl ketone. The cost of using solvents, however, and the fire and health hazards created by their use render the method undesirable.

The seal coat can contain stabilizers to retard the decomposition of the vinyl resin and increase the life of the product, such as sulfides and sulfites of aluminum, silver, calcium, cadmium, cerium, sodium, magnesium, strontium; lead and tin stearates; oleates and other complexes; glycerine, leucine, alanine, o- and p-aminobenzoic and sulfanilic acids, hexamethylene tetramine, salts including phosphates, stearates, palmitates, oleates, ricinoleates, abietates, laurates, salicylates; and the like.

The seal coats are characterized by comprising a vinyl resin, that is, a polymeric material obtained by polymerizing compounds containing at least one —CH=C radical. Useful vinyl resins include polymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like, and copolymers of the above with other monomers copolymerizable therewith, such as vinyl esters including vinyl bromide, vinyl chloroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl maleate, dimethyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone, and the like. The monomers listed hereinabove are useful in preparing copolymers with a vinyl resin can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention.

A plasticizer for the vinyl resin is also frequently present in the seal coat composition. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers such as butadiene-styrene copolymer, butadiene-acrylonitrile copolymer and the like, and other materials which function as plasticizers such as epoxidized drying oils, aromatic hydrocarbon condensates and the like. Where certain flexible soft vinyl resins are used in formulating the seal coat, such as polymers containing large proportions of ethyl acrylate, no plasticizer is needed. However, in most instances, a plasticizer is essential in order to impart the necessary properties of flexibility to the dried seal coat film.

Seal coat compositions can contain solid filler. The term filler as used herein embraces both coloring pigments such as titanium dioxide, zinc oxide, and the like as well as inert filling materials such as barium sulfate, calcium sulfate, magnesium carbonate, magnesium silicate, silica, both amorphous and crystalline, whiting, talc, clay, pumice, limestone and the like. The dried seal coat film can contain up to 90 percent by weight of filler.

As described hereinabove, if seal coats are utilized, they would have a total thickness of about 2 to about 12 mils. Thicker coats are used when necessary to insure complete covering of all irregularities in the fibrous backing sheet and yield a smooth surface for printing or coating. The use of multiple coats is particularly effective since the formulations for the individual coatings can be specially designed for the particular requirements of each coating. Thus, the coating applied directly to the fibrous sheet, is designed to provide a high degree of seal against migration of the impregnant. The upper coating, upon which the decorative design is printed, is designed to provide a film to which the vinyl printing inks and/or vinyl wearing surface layer will adhere.

An intermediate seal coat can be used to provide a bridge between the first and uppermost coatings, thereby promoting optimum adhesion between the coatings and insuring a high degree of resistance to delamination in the finished product. In addition, where three seal coats are used, the desired total thickness can be obtained using the conventional techniques of coating such as flexible doctor roller application. Several thin coats are also preferred over one thick coat to insure level and smoothness of the coatings and to insure complete drying after their application.

If it is desired to print a design on the surface of the felt, this can be accomplished by any of the conventional printing techniques such as rotogravure, offset printing, lithrograph or the like.

The impregnated felt, with or without seal coats, is then coated with a resinous wear resistant composition. This layer can be transparent if a printed design or coloration is on the felt or it can be pigmented to any color desired in the finished product. The opaque coating composition comprises a resinous binder, pigment, filler and stabilizers and a liquid dispersion medium. If the coating is to be transparent, the pigment and fillers are usually omitted. In the coating composition the ratio of filler to resin binder usually does not exceed one to four or including transparent coating would be in the range of 0 up to about 25 percent pigment filler. The greater the pigment filler, the less wear resistance of the composition in the final product.

The resinous binder used in the coating composition must be one that can be coalesced, fused or cured into a continuous wear resistant layer by the application of heat. The preferred resinous binder in the coating composition comprises thermoplastic resinous material since such materials are particularly suitable to the production of flexible surface coverings. The thermoplastic resinous binder can be made up solely of thermoplastic resin but it is preferred, in addition, to use a plasticizer.

Useful thermoplastic resins include polymers and copolymers of vinyl chloride, vinyl acetate and similar vinyl esters, acrylic and methacrylic acids and their derivatives, polystyrene, polymerized methylstyrene, polybutadiene and the like. Polymers of vinyl chloride have been found particularly effective in the formulation of coating emulsions in the invention because of their high wear resistance. The vinyl chloride polymers can either be simple, unmixed homopolymers of vinyl chloride or copolymers, terpolymers or the like in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl ispropyl ether, vinyl chloroethyl ether and the like; cyclic unsaturated compounds such as styrene, the mono- and polychloro-styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene chloroprene, 2,3-dimethylbutadiene-1,3, piperylene, divinyl ketone and the like.

As already discussed, thermoplastic resinous material can be produced which has satisfactory flexibility at normal temperatures without the presence of plasticizer to be useful as the resinous binder in the coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbons condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins such as butadiene-styrene copolymer, butadiene-acrylonitrile copolymer, polymerized chloroprene, natural rubber and the like can also be used as resinous binders in the formulation of coatings for use in the invention.

The coating composition also contains fillers and pigments in accordance with the particular color desired in the finished product. Inert fillers such as silica, both amorphous and crystalline, whiting, talc, clay, pumice, limestone and the like are suitable. Pigments are selected in accordance with the desired color. For example, where a white background is desired titanium dioxide and zinc oxide either alone or with extenders such as barium sulfate, calcium sulfate, magnesium carbonate, magnesium silicate and the like can be used. For colored background coatings any of the well known organic or inorganic pigments can be used in the coating emulsion. In the production of the coating composition in the form of an emulsion the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium, and the like, glycerine, leucine, alanine, o- and p-amino benzoic and sulfanilic acids, hexamethylene tetramine, weak acid radicals including oleates, recinoleates, abietates, salicylates and the like. Normally, the composition contains from 0.5 to 5 parts stabilizer per 100 parts resin.

When the coating composition is formulated as an aqueous emulsion, the dispersion is formed in the conventional manner and with conventional ingredients well known in the latex art. The coating emulsion in general contains about 40 to about 65 percent solids with the balance being water. In addition to the resinous binder, pigment, filler and stabilizer, the emulsion contains conventional wetting agents, thickening agents, antifoam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable antifoam agents are pine oils, silicone antifoam agents such as are manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. The alkali provides a pH of above 7.0 so that there will be no tendency for the latex to coagulate. Calcium hydroxide, ammonia, and potassium hydroxide are suitable alkalies for this purpose.

Particularly unusual results can be obtained if small quantities of blowing agent are added to the coating composition. A blowing agent can be selected which decomposes at the fusion temperature of the resinous composition to form a cellular structure in the coating. Typical of suitable blowing agents are complex organic compounds which when heated decompose to yield a gas and which have residues which are compatible with the resinous composition. Such materials have the property of decomposition over a narrow temperature range which is particularly desirable to obtain a good foam structure. Compounds having the double bond $=N-N=$ and $-N=N-$ linkages decompose at elevated temperatures to yield an inert gas high in nitrogen. Such compounds include substituted nitroso compounds, substituted hydrazides, substituted azo compounds and the like, such as p,p'-oxybis-(benzenesulfonyl hydrazide), N,N'-dimethyl-N,N'-dinitroso terephthalamide, dinitrosopentamethylenetetramine, and azodiformamide. They are usually present in from 1 percent to about 10 percent by weight of resin.

The coating can be applied from other types of liquid compositions. For example, thermoplastic resinous plastisol and organosol coating systems can be used. In this case the dispersion medium instead of being water is a plasticizer for the resinous binder in the case of a plastisol and a mixture of plasticizer and volatile organic solvent in the case of an organosol.

The resinous composition is applied to the backing by any of the conventional techniques well known in the coating art such as roller coating, doctor blade coating, spray application, brush application and the like. The coating must be so formulated as to have sufficient flexibility to allow it to be embossed to a depth greater than its thickness. The coating is preferably about 3 to about 20 mils in thickness. The most economical product is obtained, of course, with the thinnest possible coating. After the coating has been applied to the backing, the sheet must be subjected to heat in order to evaporate any volatile components and to set or fuse the resinous binder into a flexible uniform film. The temperature which the coated layer must attain is dependent on the particular resinous binder used. With the preferred thermoplastic resinous binders, the coating is preferably heated to the fusion temperature of the resin, that is, the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature with the range of about 250° F. to about 375° F. and preferably 275° F. to 350° F. is sufficient to yield a uniform film. A similar heat treatment step is carried out when an elastomeric resinous coating composition is applied to a surface of the backing to yield a pigmented layer thereon. Heating can be effected by any means such as passing the sheet through a forced hot air oven or by placing radiant heating elements above the coated surface.

The resinous composition coating is preferably fed to the embossing mechanism while heated to a temperature where the coating can be readily deformed. A substantial heat saving is effected by feeding the coated sheet immediately after fusion to the embossing apparatus. The embossing roll is usually water-cooled and maintained at a temperature of at least 25° F. below the temperature of the composition. This temperature differential prevents the coating from sticking to the embossing roll. The resilient back up roll asserts sufficient pressure against the back of the sheet to assure a good registry of the design in the coating. The presence of the felt allows the design to be embossed to a depth greater than the thickness of the coating. The depth of embossing will depend a great deal on the flexibility of the coating in allowing deformation. If desired, a printing ink or similar resinous material can be applied to the surface of the embossing roll so that the color in the embossed areas contrast with the basic color of the sheet.

After the embossing operation, the felt sheet is stripped from the coating layer. This stripping operation can be carried out conveniently between two rolls. It is necessary when first starting the stripping operation to remove part of the backing material by hand so that the coating and backing sheet can be drawn off on the opposing rolls. It is essential that the angle of felt at the point of removal be at an angle of about 90° to about 180°. As indicated previously, the adhesive strength between the coatings and felt must be greater than the strength of the felt. The relative resistance of delamination of any given coatings or felt can be readily determined by making a small test. It is preferred that the delamination strength of the felt be less than 2.5 pounds per linear inch. A value of below 1.9 pounds per linear inch is particularly effective. This stripping leaves a layer of fine fibrous material which remains on the underside of the coating and creates an excellent bridge between the resinous coating to enable it to be secured to any surface using conventional adhesives. The remaining fibrous material on the backing of the coating is preferably less than 10 mils in thickness with a range of 3 to 8 mils being particularly effective.

In a preferred embodiment of the invention the impregnant selected for the felt is one which will soften or be plasticized by the plasticizers contained in the wear layer or seal coats. During the heating step to solvate the resin in the wear layer, the plasticizer in the wear layer will migrate down into the felt. If the impregnant of the felt is sensitive to this plasticizer, it will cause a softening of the impregnant at the surface of the felt. These softer areas will greatly aid in removal of the felt sheet from the coating since it creates a weak area in the felt at the interface.

Typical wear layer formulations for use in the invention are as follows:

Example I

| | Parts |
|---|---|
| Vinyl chloride-vinyl acetate copolymer | 50 |
| Tricresyl phosphate | 15 |
| Xylene | 40 |

Example II

| | |
|---|---|
| Vinyl chloride polymer | 50 |
| Dioctyl phthalate | 17 |

Example III

| | |
|---|---|
| Vinyl chloride polymer | 80 |
| Dioctyl phthalate | 13 |
| Tricresyl phosphate | 14 |
| Stabilizers | 4 |
| Mineral spirits | 17 |
| Methyl ethyl ketone | 2 |

Typical seal coat formulations are as follows:

Example IV

| | Parts |
|---|---|
| Vinyl chloride polymer latex (50% solids) | 30 |
| Butadiene-acrylonitrile copolymer latex (50% solids) | 30 |
| Sodium alkyl aryl sulfonate | 2 |
| Titanium dioxide | 14 |
| Whiting | 54 |
| Methyl cellulose suspension (7% solids) | 15 |
| Water | 20 |

Example V

| | |
|---|---|
| Vinyl chloride polymer latex (50% solids) | 42 |
| Butadiene-acrylonitrile copolymer latex (50% solids) | 44 |
| Dioctyl phthalate | 7 |
| Sodium alkyl aryl sulfonate (5% dispersion) | 4 |
| Sodium hydroxide solution (25% solids) | 0.4 |
| Titanium dioxide | 25 |
| Whiting | 100 |
| Methyl cellulose dispersion (3.5% solids) | 20 |
| Water | 62 |

Example VI

| | |
|---|---|
| Vinyl chloride-vinyl acetate copolymer latex (50% solids) | 400 |
| Butadiene-styrene copolymer latex (45% solids) | 350 |
| Titanium dioxide | 120 |
| Limestone | 500 |
| Tetrasodium pyrophosphate | 2.5 |
| Resin acid soap | 4 |
| Carboxymethyl cellulose | 4 |
| Water | 350 |

A typical method for preparing an impregnated felt for use in accordance with the invention is as follows:

Example VII

A fiber stock made up of a furnish consisting of 46 percent corrugated boxes and 54 percent new cotton cuttings is refined in a Jordan mill and blended in a mixing chest to produce a water slurry containing 2.5 percent solids. An emulsion containing 12 percent solids of polymerized vinyl acetate (having a ASTM Ring and Ball softening point of 395° F.) is added to the mixing chest so that the amount of polymer equaled 8 percent of the dry weight of the fibers. The resin is caused to form agglomerates by the addition of 20 percent alum solution to the mixing chest. The resulting mixture is diluted to ½ percent solids and the dilute slurry is formed into a web on a single cylinder paper machine.

The web is dried and passed through a dip tank containing a resinous petroleum fraction as a 40 percent solids solution in petroleum naphtha solvent. The petroleum resinous fraction has the following properties:

| | |
|---|---|
| Form | Semi-solid. |
| Softening point | 79° F. (Ring and Ball Method). |
| Color | 14 (Gardner Color Scale). |
| Density | 0.98 gram/cubic centimeter. |
| Ash content | 0.3 percent. |
| Viscosity | 98 Saybolt - Furol seconds @ 210° F. |

The web after being passed through squeeze rolls contains 35 percent petroleum resin based on the dry weight of the fibers. The web measures 0.043 inch in thickness and has a gauge to weight ratio based on the weight of resin-free dry fibers of 0.90. The impregnated web is dried on conventional drying cans.

Example VIII

An impregnated felt prepared as in Example VII is passed through a roll coater which applies a uniform coating on one surface of the felt of approximately 8 mils in thickness. The coating was formulated according to Example I and contained approximately 5 percent of green pigment. The coated felt was then passed through a hot air oven to raise the temperature of the coating to approximately 375° F. thereby fusing the resin in the coating. The heating also causes a portion of the plasticizer in the coating to migrate into the surface of the felt sheet in contact with the coating. The migration of plasticizer causes a softening of the resinous petroleum fraction in the felt creating a weak area in the felt of low tensile strength. The heated sheet is then passed through embossing apparatus comprising two rolls. One roll is a steel roll having a diameter of approximately 8 inches having the decoration embossed on its surface to produce a depth of design of about 10 mils in the coated sheet. The second roll has a diameter of 18 inches and a resilient rubber covering. The embossing roll is cooled to approximately 250° F. by passing cold water through the roll. The resilient covered roll is maintained at a temperature of about 120° F. The rolls achieve pressure of about 300 pounds per linear inch on the coated felt. The embossed sheet is passed from the embossing rolls over cooling drums which lower the temperature of the coating to approximately 100° F. The cooled, coated sheet is then passed around a roll whereby the felt backing is pulled from the back of the coating at an angle of approximately 170°. The stripped felt sheet and the coating are wound on separate rolls. The product is a smooth vinyl film having an embossed design of a depth of approximately 12 mils and contains approximately 5 mils of felt on its undersurface.

Any departure from the foregoing description which conforms to the present invention is intended to be included within the scope of the claims.

What is claimed is:

1. A process for producing a flexible decorative surface covering having a thin resinous composition wear layer and a thin fibrous backing which comprises coating one surface of a unitary fibrous felt sheet with a resinous composition, heating said coating to fuse the composition and bind it to said one surface of the felt sheet, embossing a design into the coating on said felt sheet, cooling the embossed coating and thereafter removing substantially all of the felt sheet from the coating leaving only a thin, uniform layer of fibrous material adhering to one surface of said coating, the resistance to delamination of said coating from said felt sheet being substantially greater than the resistance of said unitary felt sheet to split apart adjacent to said coating, said felt sheet being split by separating the coating layer sheet from the split felt sheet layer while continuously maintaining an angle of about 90° to about 180° between each parting layer.

2. A process for producing a flexible decorative surface covering having a thin polyvinyl chloride composition wear layer and a thin fibrous backing which comprises coating one surface of a cellulosic fibrous felt sheet impregnated at least at said surface with a petroleum fraction, with a vinyl chloride composition comprising polyvinyl chloride resin, plasticizer, and up to about 25 percent pigment filler, heating said coating to fuse said resin, bind said coating to the felt sheet and soften said petroleum fraction, embossing a design into the heat-softened coating on said felt, cooling said embossed coating and thereafter removing substantially all of the felt from the coating leaving only a thin, uniform layer of fibrous material adhering to said coating, the resistance to delamination of said web in the area of softened petroleum fraction impregnant being substantially less than the resistance to delamination of said coating from said web, the separating of the coating layer from the web layer being accomplished while continuously maintaining an angle of about 90° to about 180° between each parting layer.

3. A process for producing a flexible decorative surface covering having a thin resinous composition wear layer and a thin fibrous backing which comprises coating one surface of a felt sheet impregnated with a resinous impregnant with a composition of resin and plasticizer, said plasticizer being capable of softening said resinous impregnant, heating said coating to fuse said resin, bind said coating to the felt sheet and soften said resinous impregnant in the surface of said web in contact with said coating, embossing a design into the coating, cooling the coating and thereafter removing substantially all of the web from the coating, the resistance to delamination of said web in the area of softened impregnant being substantially less than the resistance to delamination of said coating from the surface of said web, the separating of the coating layer from the web layer being accomplished while continuously maintaining an angle of about 90° to about 180° between each parting layer.

4. The process of claim 3 wherein said felt sheet is a cellulosic fibrous sheet.

5. The process of claim 3 wherein the resistance to splitting of said web is less than about 2.5 pounds per linear inch.

6. The process of claim 5 wherein said resin is a thermoplastic vinyl resin.

7. The process of claim 5 wherein said felt sheet has a gauge to weight ratio in excess of 0.8.

8. The process of claim 5 wherein said felt sheet has a thickness of about 0.020 to about 0.050 inch.

9. The process of claim 5 wherein said coating has a thickness of about 0.003 to about 0.020 inch.

10. The process of claim 5 wherein the layer of fibers remaining adhered to said coating has a thickness of less than 0.010 inch.

11. The process of claim 5 wherein said layer of fibers remaining adhered to said coating has a thickness of about 0.003 to about 0.008 inch.

12. The process of claim 5 wherein the delamination strength of said felt sheet is less than 1.9 pounds per linear inch.

13. The process of claim 5 wherein said embossed design extends to a depth greater than the thickness of said coating.

14. The process of claim 5 wherein said impregnant is a petroleum fraction.

15. The process of claim 6 wherein said coating is heated to a temperature of about 250° F. to about 375° F. to fuse the resin.

References Cited in the file of this patent

UNITED STATES PATENTS

| | | |
|---|---|---|
| Re.23,741 | Summers | Nov. 17, 1953 |
| 1,663,954 | Respess | Mar. 27, 1928 |
| 2,126,908 | Moore | Aug. 16, 1938 |
| 2,512,727 | Rice | June 27, 1950 |
| 2,537,126 | Francis | Jan. 9, 1951 |
| 2,579,589 | Lehmberg | Dec. 25, 1951 |
| 2,587,171 | Knewstubb et al. | Feb. 26, 1952 |
| 2,605,204 | Benedict et al. | July 29, 1952 |
| 2,714,559 | Sheffield et al. | Aug. 2, 1955 |
| 2,783,175 | Smith et al. | Feb. 26, 1957 |
| 2,842,473 | Oberly et al. | July 8, 1958 |